May 25, 1937. E. E. HALL ET AL Re. 20,378

EXPANSION JOINT

Original Filed Aug. 12, 1932 2 Sheets-Sheet 1

Inventors
Eric E. Hall and
William H. Eichelman.
By Otto M. Nermich
Attorney.

May 25, 1937. E. E. HALL ET AL Re. 20,378

EXPANSION JOINT

Original Filed Aug. 12, 1932 2 Sheets-Sheet 2

Inventors
Eric E Hall and
William H. Eichelman
By Otto M. Wernicke
Attorney.

Reissued May 25, 1937

Re. 20,378

UNITED STATES PATENT OFFICE 20,378

EXPANSION JOINT

Eric E. Hall, Chicago, and William H. Eichelman, Des Plaines, Ill., assignors, by direct and mesne assignments, of one-fourth to said Eichelman and one-fourth to James E. Whealan, Chicago, Ill., and one-half to James H. O'Brien, trustee Original No. 1,958,391, dated May 8, 1934, Serial No. 628,576, August 12, 1932. Application for reissue October 1, 1934, Serial No. 746,470

26 Claims. (Cl. 94—18)

Our present invention relates to improvements in expansion joints for monolithic concrete construction, precast slabs and the like. It is appreciated and generally recognized that in monolithic construction either in walls, floors, or pavements, there is an appreciable movement of slabs, known as expansion and contraction due to the change in the elements; that is, alternate heat and cold, which is especially applicable to tanks or vats constructed of concrete adapted to be liquid or water tight.

It is an object of this invention to provide an expansion joint that will effectively join the slabs and allow of an independent linear movement, due to expansion or contraction, and at the same time seal the joining of these slabs watertight. Another object of this invention is to provide an expansion joint which will further serve as a screed, easily to be installed and accurately located relative to the depth or thickness of slab.

It will moreover be seen that with our construction, such refinement as the securing of adjacent monolithic structures or slabs, the anchoring of the same together, allowing for movement, and the making of the joint watertight may be secured with little, if any, additional expense.

We attain the foregoing objects by means of the structure illustrated in the attached drawings:—

Similar reference characters refer to similar parts throughout the respective views.

It will be recognized that this joint is readily applicable to precast or monolithic walls, but for purposes of description only, we prefer to describe the joint in combination with floor slabs, or road construction.

Figure 1:
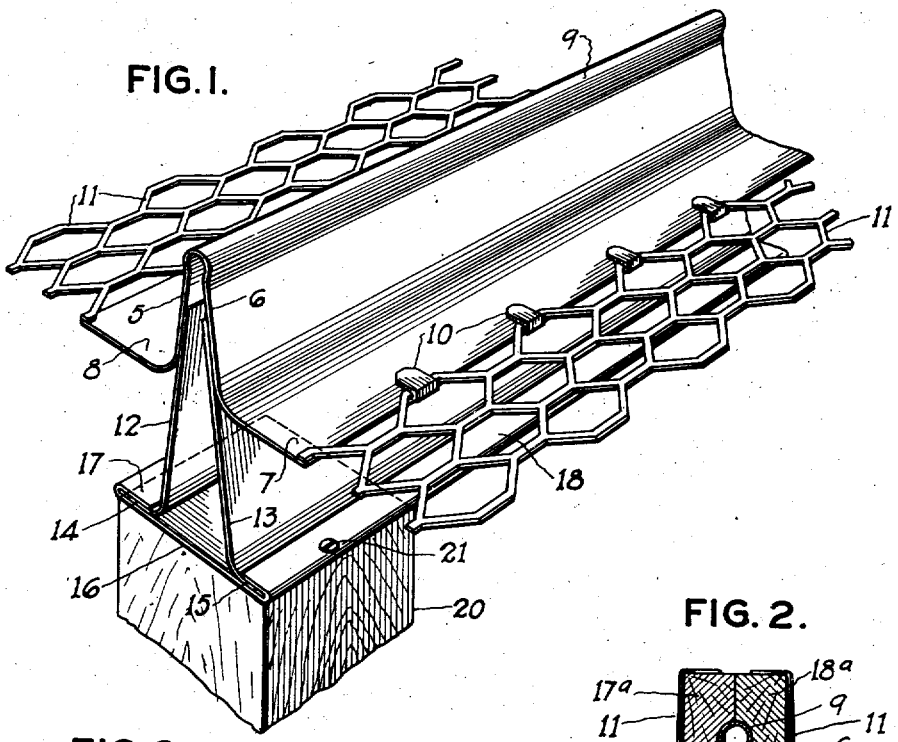
Fig. 1 is an isometric view of a section of the expansion joint shown affixed to the grade stake.

Our expansion joint can advantageously be made from a strip of flexible material, preferably sheet copper, comprising a seal consisting of a hairpin fold with inclined sides 5 and 6, terminating in laterally extending webs or anchors 7 and 8. The top of the hairpin fold preferably is beaded, forming a ridge 9 at the top. The webs 7 and 8 at intervals along their outer edge are provided with lugs 10, of the same metal as the webs themselves, which lugs are turned back against the webs 7 and 8 and are adapted to receive and lock in place strips of fabric or metal lath 11, as clearly indicated in Fig. 1 of the drawings.

Supporting the seal of the expansion joint just described, and secured thereto, preferably by means of brazing or soldering, is a stool, comprised of two (2) inclined wall structures or supports 12 and 13, the bottom edges of which are flared outwardly at 14 and 15 to act as feet or supports for the stool. Tying together and connecting these bottom feet 14 and 15 is a flat transverse strip 16, which is flanged over the outer edges at 17 and 18 to lock and form a seam definitely positioning the feet and the support. In bending this metal back, a space or opening is left between the outer edge of the feet 14 and 15 and the inner edge of the folds 17 and 18, which will allow of a substantial transverse movement of the members 12 and 13.

Figure 2:
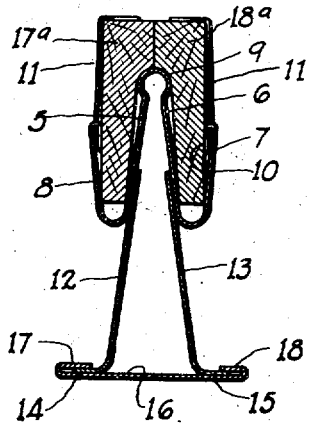
Fig. 2 is a vertical transverse section through the expansion joint unit itself shown in the compact form and in the manner in which it is shipped to the job ready for assembly.
Figure 3:
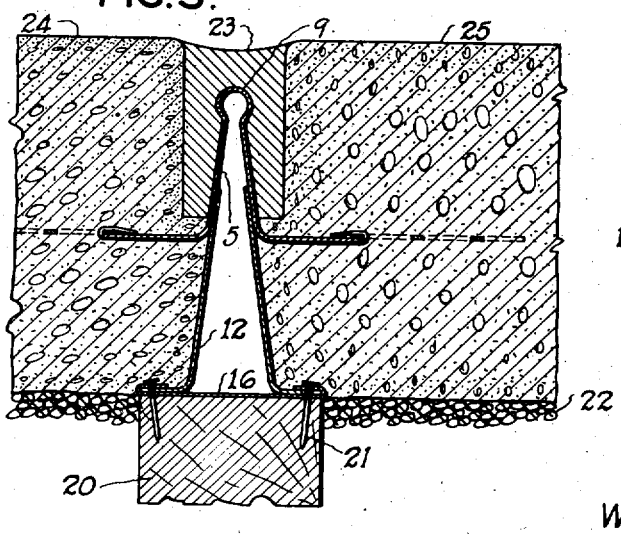
Fig. 3 is a similar transverse section through the joint installed, connecting two (2) monolithic slabs.

In assembling the expansion joint for shipment to the job, wood moulding in two (2) pieces as indicated in Fig. 2 reference characters 17a and 18a, is fitted to the contour of the hairpin fold and ridge so that the top of the wooden moulding has a definite relationship to the top of the expansion joint itself. The lateral arms or webs 7 and 8 are bent upwardly and adjacent to this wooden moulding and the metal lath is further carried up and around the moulding as clearly indicated. This facilitates shipment to the job and the handling in the field. The wooden members 17a and 18a further serve the purpose of definitely locating the expansion joint in the slabs and when installed serves as a screed, as hereinafter described.

The installation and operation of the expansion joint above described is as follows:—

Grade stakes indicated at 20, are positioned at intervals in lines and at points where the expansion joint is to be laid. These grade stakes are set at an exact pre-determined elevation relative to the concrete slabs themselves. The expansion joint then is set in strips connecting the grade stakes and is nailed or screwed to them as indicated at 21. The wooden moulding is left in place. The webs 7 and 8 are bent down to extend outwardly in their transverse position, as is also the metal lath. The grading 22 of the ground is brought up to the top of the grade stakes. The concrete is poured in slabs 24 and 25 on both sides of the expansion joint, either at separate intervals or both sides may be poured at the same time. The top of the wooden moulding will then act as a screed against which the workman finishes his concrete surface. When the concrete has set up, the wooden moulding being in two pieces, is easily removed; thus, leaving an opening between the slabs of concrete, which opening is to be cleaned out thoroughly and then filled, preferably with a bitumen or hot pitch, or asphalt preparation 23. This makes a watertight construction, as the hot pitch or tar will adhere to the concrete and also to the seal and prevent water from seeping through the joint. The ridge or bead 9 will then hold this filling down in place after it has hardened, as the bead forms a definite shoulder against sectional displacement. At the same time, when the respective slabs either expand or contract, the hairpin and substructure will move either inwardly or outwardly without effecting the destruction of the joint, as the metal lath being cast integral with the slabs and affixed to the web of the seal permanently and definitely anchors the expansion joint in place.

The hairpin fold of the flexible seal extends above and acts independently of the cushioning air space in the stool, moving together and spreading out with the expansion and contraction of the slabs in which its anchors 7 and 8 are firmly embedded.

Figure 4:
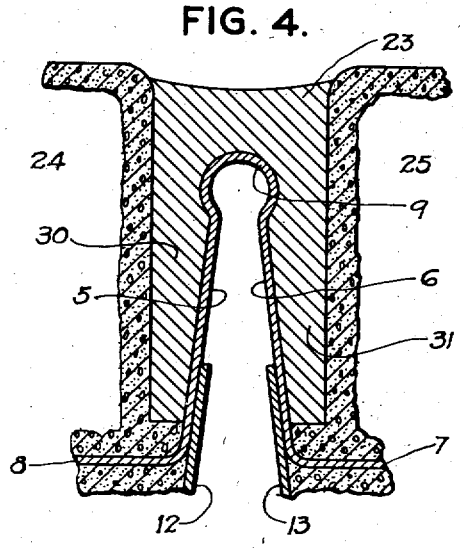
Fig. 4 is an enlarged diagram of the sealing member shown engaging the slabs as initially installed and prior to the subsequent movement of the slabs.

Figure 4 of the drawings diagrammatically illustrates the relative position of the seal and filler installed between adjacent slab sections at the time of installation and prior to the movement occasioned by either expansion or contraction of the slabs.

Figure 5:
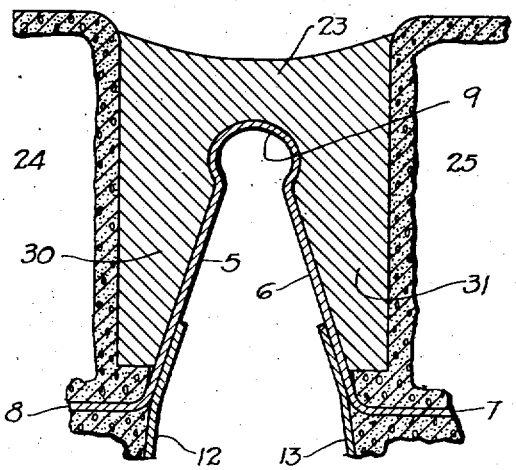
Fig. 5 is a like view showing the relative positions of the seal and slabs after the slabs have contracted.

Figure 5 in a similar manner illustrates the relative position of the seal and filler subsequent to the lateral movement or diverging or spreading out of the slabs due to the contraction of the slabs and the resultant expansion or opening up of the joint, and Figure 6 is again a like view to Fig. 4, and in a like manner illustrates the relative position of the seal and filler subsequent to the movement occasioned by the expansion of the slabs and the resultant closing up or moving together of the walls of the seal.

Figure 6:
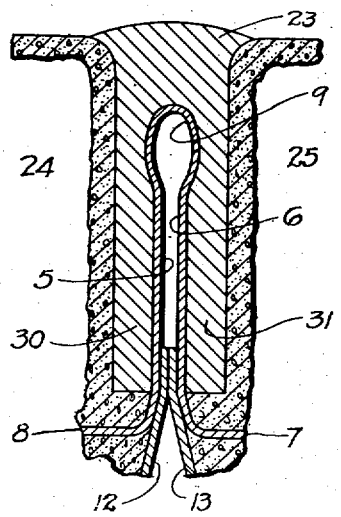
Fig. 6 is a view similar to Figs. 4 and 5 showing the relative positions of the seal and slabs after the slabs have expanded.

Figures 4, 5, and 6 are presented to graphically illustrate the basic principles involved in applicants' particular combination of a specific type of seal and a specific design of filler in combination with a stool effecting an air space or cushion below the seal and through the entire slab depth or cross section.

This structure, including the seal and the filler 23, provides a means whereby the sealing effect of the filler between the ends of the slab sections is maintained as the dimension of the space between the slab sections 24 and 25 either increases or decreases. This advantage is accomplished by virtue of the construction of the seal and the placing of the yieldable filler 23, and the particular arrangement of certain portions thereof relative to the walls 5 and 6 of the seal and the ends of the slab sections. It will be noted with reference to Fig. 4 of the drawings, that the walls 5 and 6 of the hairpin fold are spaced from the respective ends of the slab sections, also that the filler has a portion which bridges this space and has legs such as 30 and 31 which are disposed within the respective spaces provided between each of the walls 5 and 6 of the seal and the end of an adjacent slab section.

The construction of the seal and the relative arrangement of the legs of the yieldable filler, walls 5 and 6 of the seal, and the ends of the slabs, provide means whereby the sealing effect between the filler, the walls 5 and 6 of the seal, and the slab sections is uninterruptedly maintained as the dimension of the space between the slab sections is increased, due to the contractive movement of the slabs, which is illustrated at Fig. 5 of the drawings.

It may also readily be seen upon reference to Fig. 6 of the drawings, that the expansive movement of the slab sections is likewise transmitted to the legs 30 and 31 of the filler, which as before, causes engagement between said leg portions and the walls 5 and 6 of the seal, and the ends of the respective slab sections. This likewise results in eliminating the separation of the filler and the ends of the slab sections, and insures against the infiltration or intrusion of water, dirt, etc. into the space between the slab sections and the seal.

We have made mention above that the hairpin fold of the joint should preferably be of copper. At this point it is well to note that the sub-structure or support of the hairpin fold itself may be constructed of iron, as this structure tends only to support the hairpin fold during pouring, and after the concrete has taken its final set, the bottom support has served its purpose as a form and support, and should it become corroded and be wasted away, it will not affect the finished joint. The same applies to the wooden grade stakes.

It is well to mention at this point also that whereas we have shown and specified throughout a metal fabric being secured to the lugs 10, it is our desire to make mention of the fact that webs 7 and 8 may themselves be extended further than as shown in the drawings and either be corrugated or perforated so that a concrete bond may be made through the openings and still comply with this invention.

Having thus described our invention, what we claim as new and desire to secure by Letters Patent is:

1. In a device of the kind described, the combination of a member comprised of a piece of material bent upon itself to provide spaced walls movable relatively to each other in said space and from said bend, each of said walls having an outwardly extending flange at the lower termination of said walls providing means for forming a bond between said flanges and the material in which said flanges are adapted to be embedded, a member providing a screed, said screed having a groove for the reception of said walls, a support for said first mentioned member, said support having a base and means extending from said base into cooperation with said walls to hold said walls in spaced relation to each other.

2. In a device of the kind described, the combination of a member comprised of a piece of resilient material bent upon itself to provide spaced walls extending downwardly from said bend and movable relatively to each other in said space from said bend, each of said walls having an outwardly extending element arranged at the lower termination of said walls providing means forming a bond between said member and the material in which said elements are adapted to be embedded, a support for said member, said support having a base and walls extending from said base into engagement with said walls of said member and providing means assisting to prevent movement of said walls of said member toward each other.

3. In a device of the kind described, the combination of a member formed of a piece of resilient material bent upon itself to provide spaced walls movable relatively to each other at the bend, the material forming said walls being bent to provide an outwardly projecting extension at the lower edge of each of said walls, a support for said member, said support having spaced walls, the upper terminations of said walls being located within the space provided between said spaced walls of said member and providing means assisting to hold said walls of said member in spaced relation to each other.

4. In a device of the kind described, the combination of a member formed of a piece of resilient material bent upon itself to provide spaced walls movable relatively to each other at the bend, said material being formed to provide a bead at said bend, the material forming said walls being bent to provide an outwardly projecting extension at the lower edge of each of said walls, a support for said member, said support having spaced walls, the upper terminations of said walls being located within the space provided between said spaced walls of said member and providing means assisting to hold said walls of said member in spaced relation to each other.

5. In a device of the kind described, the combination of a member formed of a piece of resilient material bent upon itself to provide spaced walls movable relatively to each other at the bend, the material forming said walls being bent to provide an outwardly projecting extension at the lower edge of each of said walls, said extensions having means whereby a fabric may be attached thereto, a support for said member, said support having spaced walls, the upper terminations of said walls being located within the space provided between said spaced walls of said member and providing means assisting to hold said walls of said member in spaced relation to each other.

6. In combination, a pair of adjacent concrete sections forming a part of a concrete road or the like, and an expansion joint interposed between said sections comprising a closure for connecting the adjacent ends of the concrete sections, said joint consisting of a flexible seal interposed between the adjacent ends of the concrete sections, integral anchors projecting transversely therefrom and into the respective ends of the concrete sections, a yielding filler interposed between said concrete sections and seal, and over and above said seal, and a substructure supporting the joint so formed prior to the pouring of the concrete sections, said substructure comprising a stool formed with spaced side walls, and a base for said side walls, said side walls being temporarily joined to said flexible seal prior to the pouring of the concrete sections.

7. In combination, a pair of adjacent concrete sections forming part of a concrete road or the like, and an expansion joint interposed between said sections comprising a closure for connecting the adjacent ends of the concrete sections, said joint consisting of a flexible seal interposed between the adjacent ends of the concrete sections, said seal having integral anchors engaging the respective ends of the concrete sections, a yielding filler interposed between said concrete sections and said seal, and means for supporting the joint so formed prior to the pouring of the concrete sections, said means comprising a stool formed with spaced walls temporarily joined to the base of said flexible seal prior to the pouring of the concrete sections.

8. In combination, a pair of adjacent concrete sections forming part of a road or the like, and an expansion joint interposed between said sections comprising a closure for connecting the adjoining sections, said joint consisting of a flexible seal interposed between the adjacent ends of the concrete sections, integral anchors extending therefrom and into the ends of the concrete sections, a yielding filler interposed between and contacting the concrete sections and seal and over and above said seal, and a substructure supporting the joint so formed prior to pouring of the concrete sections, said substructure comprising a stool temporarily joined to said flexible seal prior to the pouring of the concrete sections.

9. A joint for sealing a space between ends of adjacent slab sections, the slab sections having portions which are offset with relation to each other, said joint including a flexible member connected with the respective ends of said slab sections, and a yieldable filler bridging the space between the ends of the slab sections and having portions engaging the offset portions of said slab sections, said flexible member providing means acting upon said filler to maintain engagement between said filler and the slab sections upon an increase in the dimension of said space between said slab sections.

10. A joint for sealing a space between ends of adjacent slab sections, said slab sections having portions which are offset with relation to each other, said joint being comprised of a flexible seal having spaced connected walls, a yieldable filler capping said seal, and means for connecting said joint to the ends of the adjacent slab sections, said filler engaging the offset portions of said slab sections, and said seal providing means for maintaining an uninterrupted contact between the filler and said slab sections upon a change in dimension of the space between said slab sections.

11. A joint for sealing a space between ends of adjacent slab sections each of which has a shoulder, said joint including a seal formed from a piece of flexible material and fashioned to provide connected side walls, a flange extending from each of said walls, said flanges providing means for connecting said seal to the spaced ends of the adjacent slab sections, the connected side walls of said seal being located in the space between the slab sections when associated with said slab sections and being spaced from the ends of said slab sections, and a yieldable filler having a portion thereof extending across the connection between the side walls of the seal and having another portion thereof extending into the space between said side walls and into engagement with the shoulders of the ends of the adjacent slab sections.

12. A joint for sealing the space between ends of adjacent slab sections, said joint including a flexible seal having oppositely extending flanges respectively adapted to be embedded in said slab sections, said seal having an element extending from said flanges into the space between said slab sections, said element being spaced from the ends of said slab sections, a yieldable filler capping said element and having portions located between said element and the slab sections and engaging said slab sections, said element providing means for maintaining direct engagement between said filler and said slab sections upon an increase in dimension of said space between said slab sections, and a support for said seal consisting of spaced walls providing an air chamber between the walls and said slab sections, said support being connected to said seal and providing means for maintaining the seal in its distended position during the pouring of the plastic concrete.

13. A joint for sealing a space between ends of adjacent slab sections, said joint comprising a flexible seal, a yieldable filler, and a support for said seal, said seal being formed to provide a portion which extends into said space in spaced relation to said slab sections, means for anchoring said seal to the respective slab sections, said yieldable filler having a portion which bridges the space between said slab sections capping said seal and having portions located between and engaging said slab sections and that portion of said seal which extends into the space between said slab sections, said support for said seal consisting of a hollow structure, said seal capping said structure, and said support providing means for maintaining said seal and filler against collapse during the pouring of the plastic concrete.

14. A sealing member consisting of a plastic body adapted to be located between spaced slab sections, resilient means for maintaining said plastic body in engagement with the slab sections, and anchors connecting the resilient means with the slab sections to cause movement of the plastic body with the slab sections, said plastic body being formed to extend over the top and down along the sides of said resilient means and being spaced from said anchors by a shoulder of the material of which said slab sections are formed, said shoulders being located between said anchors and said plastic body and assisting in the support of said plastic body.

15. An expansion joint consisting of a stool, a seal, and a plastic body, said stool being inserted in said seal and providing means for maintaining said seal temporarily distended, said seal being inserted in said plastic body, said seal having anchors for securement in adjacent slab sections, and said plastic body having one portion extending over said seal and having a second portion located between said seal and slab sections to simultaneously engage said seal and said slab sections.

16. An expansion joint consisting of a stool, a seal, and a plastic body, said stool being inserted in said seal and providing means for temporarily maintaining said seal distended, said seal being inserted in said plastic body, said seal having a beaded top, and said plastic body having a portion extending over said beaded top and having portions located between the sides of said seal and the face of the slab sections to engage said seal and slab sections.

17. An expansion joint for sealing a space between the ends of adjacent slab sections, said joint being comprised of a flexible seal having spaced connected walls, a yieldable filler capping said seal, said filler being engaged by said slab sections at the sides and portions of the bottoms thereof, and said seal providing means for maintaining an uninterrupted contact between the sides and bottom of said filler and said slab sections upon a change in dimension of the space between said slab sections.

18. An expansion joint for sealing a space between the ends of adjacent slab sections, said joint being comprised of a flexible seal having spaced connected walls, a yieldable filler capping said seal, said filler engaging the ends of said slab sections, said seal providing means for maintaining an uninterrupted contact between the filler and said slab sections upon a change in dimension of the space between said slab sections, and a temporary support for the seal comprising a stool constituting a yielding reinforcement between the walls of said seal.

19. In combination with a pair of concrete sections located adjacent each other, an expansion joint comprising a metal seal adapted to close the space intervening between the concrete sections and having a pair of anchoring formations embedded in said concrete sections, a pair of upwardly extending walls carried by said anchoring formations, said walls being arranged with respect to the adjacent ends of said sections to provide a space for the reception of a filler, a substantially circular bead joining the upwardly extending walls to form a part of the expansible portion of the seal, and a stool supporting the seal in its distended position between the upper and lower surfaces of said concrete sections during the pouring of the plastic concrete.

20. An expansion joint comprising the combination of a screed consisting of a channeled cap having a pair of parallel downwardly extending flanges, with a seal having a substantially circular bead located within said screed, said seal having a pair of upwardly extending walls joined at the top by said circular bead, a laterally extending anchoring flange joined to each wall, and a stool supporting the seal intermediate the top and bottom of the joint, said stool providing means for temporarily maintaining said anchoring flanges in spaced relation to each other.

21. An expansion joint consisting of a channeled cap comprised of a pair of elements each having a downwardly extending flange, a seal having a portion thereof located in said channeled cap between said elements, anchors for said seal, and a stool supporting said seal, said elements forming said cap being separated from each other and from said seal for replacement with respect to said seal and the structure with which said joint is associated.

22. In combination with a pair of concrete sections located adjacent each other, an expansion joint comprising a metal seal adapted to close the space intervening between the concrete sections and having a pair of anchoring flanges embedded in said concrete sections, a pair of upwardly extending walls carried by said flanges and located in the space intervening between said sections, a substantially circular bead joining the upwardly extending walls to form a part of the expansible portion of the seal, said anchoring flanges having openings provided therein through which the material of said slab sections extends and connects with those portions of each of the slab sections located upon the opposite sides of said flanges, and a stool supporting the seal in its distended position during the pouring of the plastic concrete.

23. An expansion joint comprising the combination of a screed consisting of a channeled cap having a pair of parallel downwardly extending flanges, with a seal having a substantially circular bead located within said screed, said seal having a pair of upwardly extending connected walls, a laterally extending anchoring flange joined to each wall, said anchoring flanges each having openings formed therein providing means adapted to receive the material of slab sections with which the joint is associated, and a stool supporting the seal and temporarily spacing the anchoring flanges of the seal from one another.

24. An expansion joint consisting of a seal having a substantially circular bead, a pair of walls extending downwardly from said bead, and a pair of laterally extending anchoring flanges one of each being joined to the base of each of said walls, said anchoring flanges having openings provided therein through which the material of said slab sections extends and connects with those portions of each of the slab sections located upon opposite sides of said flanges, a channeled cap having downwardly extending flanges respectively located between each of said walls and the adjacent end of an associated slab section, and a downwardly extending stool secured to said seal and positioned between and temporarily spacing the walls thereof.

25. In combination with a plurality of sections of concrete or the like, having their edges in juxtaposition, a sealing strip extending longitudinally therebetween with its respective side edges embedded therein, said strip comprising a central expansible bead at the top and downwardly extending body members joining the bead at each side to the embedded edge portions, said body members diverging outwardly from said bead to said edge portions and a parting strip for said sections of concrete having its upper edge extending between said body members and having means below its upper edge for engaging said sealing strip and locating the same.

26. In combination with a plurality of sections of concrete or the like, having their edges in juxtaposition, a sealing strip extending longitudinally therebetween with its respective side edges embedded therein, said strip comprising a closed flexible central portion having downwardly extending body members joining the same on either side to the embedded edge portions, said body members diverging outwardly toward said edge portions and being curved to allow independent expansion of the same and a parting strip for said section of concrete having its upper edge extending between said body members and having means below its upper edge for engaging said sealing strip and locating the same.

ERIC E. HALL.
WILLIAM H. EICHELMAN.